Figure 5:
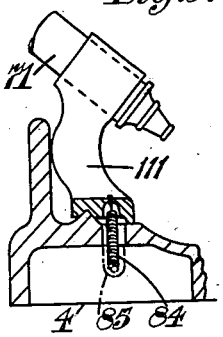

June 11, 1935. L. H. HOUNSFIELD 2,004,660
MATERIAL STRENGTH TESTING MACHINE
Filed Oct. 21, 1931 2 Sheets-Sheet 1
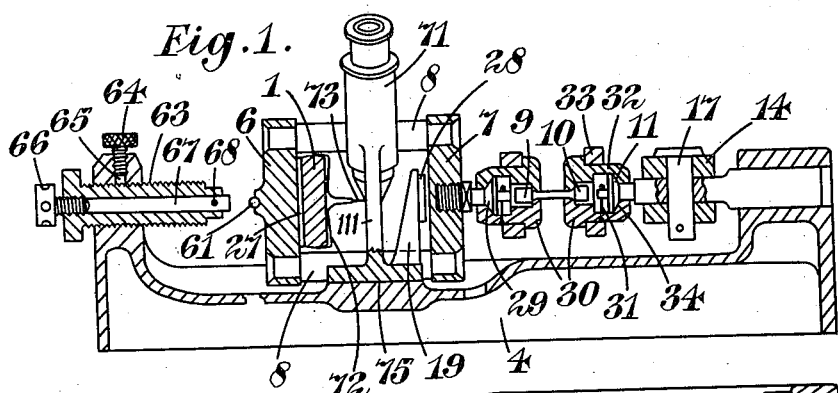
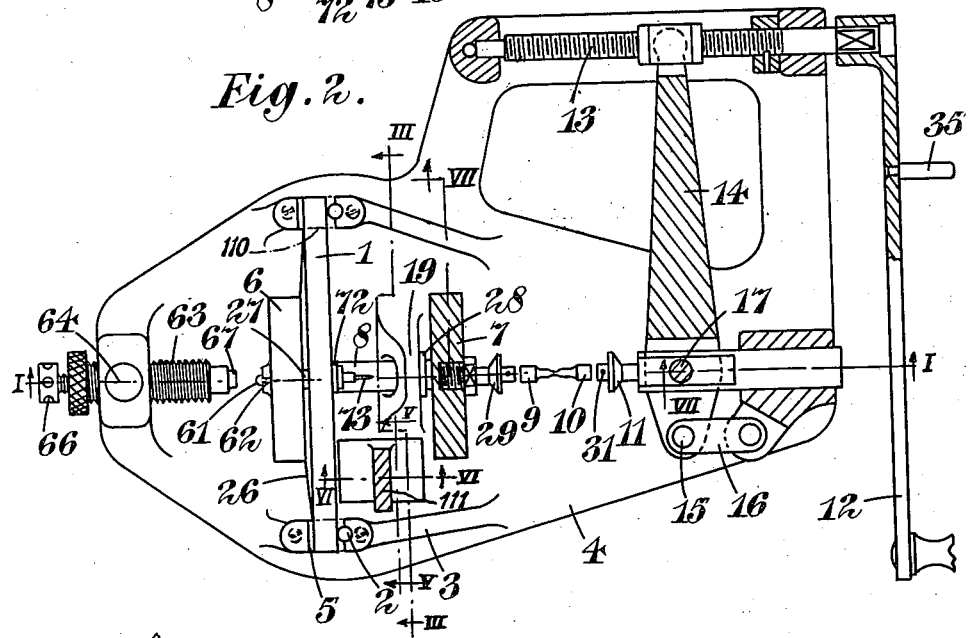
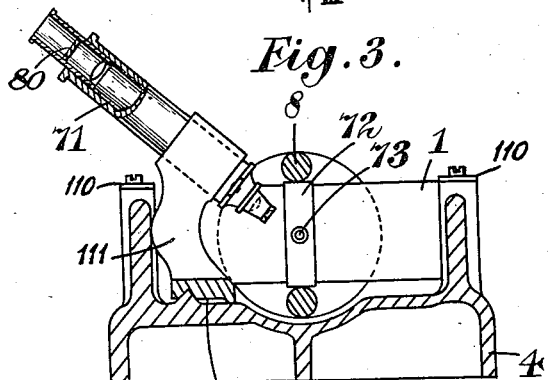
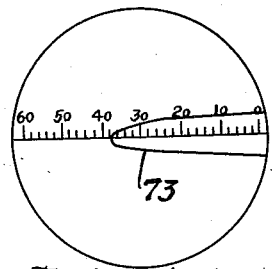
Inventor:
Leslie Haywood Hounsfield,
By Byrnes, Stebbins, Parmelee & Blenko.
attys.

Patented June 11, 1935

2,004,660

UNITED STATES PATENT OFFICE 2,004,660

MATERIAL STRENGTH TESTING MACHINE

Leslie Haywood Hounsfield, London, England

Application October 21, 1931, Serial No. 570,243
In Great Britain April 17, 1931

9 Claims. (Cl. 265—18)

This invention relates to instruments for measuring the mechanical properties of steel and other materials, i. e. those properties usually termed in the engineering industry the "physical properties". It has for its object the production of a device for testing engineering materials of construction which shall be portable, of low initial cost and capable of giving quantitative information of the following physical properties:—yield point, maximum tensile stress, breaking stress, elongation per cent., reduction in area per cent., bending and compression stress and Brinell hardness—without the use of bulky and costly test pieces.

According to this invention the ends of the specimen are held in suitable jaws, dies, dogs or chucks, hereinafter referred to as jaws, which are pulled apart until fracture of the specimen occurs, the force applied to the specimen being caused to deflect a stiff spring and the magnitude of this force being measured by determining the deflection of the spring.

In devices of this type as hitherto proposed the indicating mechanism, involving mechanical magnification of the deflection of the spring, is liable to be damaged when the specimen breaks by reason of the violent inertia forces produced by the shock of fracture, and it has been proposed in such instruments to use a fluid index, wherein the fluid column can easily join up again should it become ruptured, and such a device is described in my prior English Patent No. 320,704.

According to this invention, the deflection of the spring is measured by optical magnifying means in the form of a microscope, such that the magnifying system is free from all risk of derangement when the work stored in the strained spring is suddenly released as the specimen fractures, because no part of the magnifying system with any serious inertia is connected to the strained spring.

The observed index mark or pointer may be weightless, as, for example, a thin line scratched on the edge of the spring, or nearly weightless, such as a pointer needle attached to the spring.

Tests in compression may be conducted, or hardness may be measured with this tensile testing instrument by providing a screw or the like to force the specimen to be tested up against the other side of the spring, so that the actual force applied can be measured as before, by the deflection of the spring in the same direction.

When the machine is used for obtaining the tensile properties of a material, a specimen of the material is machined to a shape which gives it a parallel central portion with enlarged ends for the jaws to hold. As the force required to break the specimen may be great, and as it is essential that this force should be increased uniformly, it is desirable to provide reduction gear for applying the load, such as a screw operating a lever, whereof the chief object is to reduce the force of friction which occurs as a thrust on the screw thread.

This invention lends itself to variations in the precise methods of construction, but the following detailed description explains, for example, one method of general construction, with two methods for observing the spring deflection.

Figure 6:
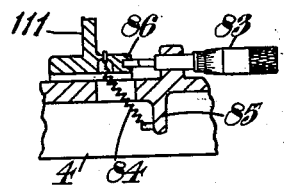
Figure 8:
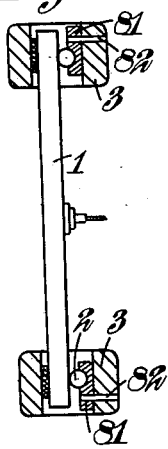
Figure 7:
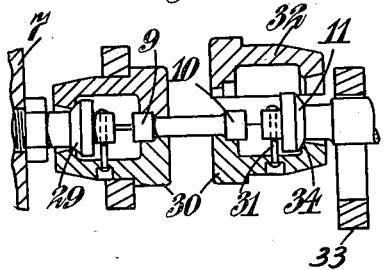

In the accompanying drawings, Figure 1 represents in elevation a vertical central section of the instrument taken on the line I—I of Figure 2 but showing the microscope in full, Figure 2 represents the instrument in plan, part being shown in horizontal section and certain parts being omitted for clearness, Figure 3 represents a transverse section, just behind the microscope taken on the line III—III of Figure 2, Figure 4 represents the "field" seen in the microscope, Figures 5 and 6 are detailed sectional views taken, respectively, on planes passing through lines V—V and VI—VI of Figure 2 but showing a modified construction;

Figure 7 is an enlarged sectional view corresponding to a portion of Figure 1 and taken on the line VII—VII of Figure 2, and Figure 8 is a sectional detailed plan view of a modified mounting for the stiff spring.

Like reference numerals indicate like parts throughout the drawings.

As shown in Figures 1, 2 and 3, a strong piece of plate spring I is supported at the ends by cylindrical "knife edges" 2 resting in rigid buttresses 3 which form part of the base casting 4. Thin plate covers 110 retain the spring I in position and rubber packings 5 also help in this respect. Two stout steel discs 6 and 7 are held to one another by the two studs 8 so as to form a stirrup surrounding the spring I.

The head end 9 of a specimen to be subjected to test is attached, as described subsequently, to the disc 7 so that when the foot 10 of the specimen is pulled the load is taken by the spring I, the deflection of which increases as the pull is increased.

Reference to Figure 2 will show how the pull is applied to a spherical head II which transmits the load to the foot 10 of the specimen. When the handle 12 is turned the screw 13 causes the trunnion end of the lever 14 to move as shown to the right and inasmuch as the fulcrum 15 is anchored to the base casting by the link 16, the pin 17 moves slowly to the right and applies the pull to the specimen.

The disc 6 is prevented from leaving its true axial position by a piece of thin plate spring 26 the length and breadth of which are about equal to the length and breadth of the spring 1. This plate spring 26 is riveted to the disc 6 and is clamped at the ends by the rubbers 5, and serves to hold the stirrup assembly against the spring. There is also a vertical strip 27 riveted to the disc 6 which enables the pull to be applied to the centre of the spring 1.

A rubber buffer 28 is attached to the post 19 to absorb the shock of the blow given by the disc 7 with its attachments when the specimen breaks. The disc 7 has attached to it another spherical head 29 which carries the jaws or chuck for gripping the head 9 of the specimen.

Each jaw for gripping the specimen is divided into two halves, see particularly Figure 7, the lower half 30 being loosely attached to the spherical head 11 or 29 by a thin pin 31 while the upper half 32 is quite free. With the retaining ring or collar 33 moved aside and the upper half of the jaw removed, as shown on the right of Figure 7, the specimen 9, 10 can be readily laid in the lower halves of the jaws 30; then the upper halves 32 can be laid in position. The retaining collar 33 can afterwards be slid over the jaws to prevent them from opening while the pull is being applied.

The inner ends of the jaws are shaped to hold the ends of the specimen while the outer ends encircle the spherical heads 11 and 29, the actual contacting surfaces 34 being made spherical to enable the jaws to align themselves with the axis of the specimen and so give a fair pull without any transverse component.

A microscope 71 is provided for measuring the deflection of the spring beam 1. The movement of a single line on the edge of the beam 1 may be observed with the microscope, but it is preferable to provide a light spring clip 72 to hold the butt end of a needle 73 against the centre of the spring beam 1 and arrange for the microscope to observe the movement of the point of the needle. One convenient method of doing this is by means of a graduated graticule 80, see Figure 3, mounted in the eye-piece. The graticule 80 consists of a transparent disc having a suitable scale marked on it. On looking into the microscope the effect is as shown in Figure 4 and the small movement of the needle point 73, greatly magnified, is clearly read off on the graduated scale in the eye-piece.

The microscope is free to move longitudinally of the slide 75, being carried on a bracket 111 slidably mounted thereon, Figures 1 and 3 so that it may be moved sideways till the needle point is at zero before the load is applied to the specimen.

By making the microscope so that the distance between the object glass and eye-piece, for instance, is adjustable, as by having the eye-piece slidable in the tube of the object glass as shown in Figure 3, the graticule may be calibrated or adjusted to suit the particular spring in use. This done, the microscope tube length may be locked, so as to give readings direct, in for instance, tons per square inch. The eye-piece readings may also be calibrated to give direct readings in any convenient units by adjusting the distance apart of the spring supports so as to vary the effective length and consequently the stiffness of the spring. For this purpose the "knife edges" 2 may be mounted as to be adjustable towards and away from one another on their supporting buttresses 3, as shown in Figure 8 wherein slidable blocks 81 carry the knife-edges 2 and are fixed in adjusted position by dowel pins 82.

Another convenient manner of using the microscope is to provide merely a "cross-wire" in the eye-piece, which would constitute an index across the centre of the field in Figure 4. For using the microscope in this manner the modifications shown in Figures 5 and 6 may be adopted.

A micrometer "head" 83 is so mounted on the base 4 in Figures 5 and 6 that it can traverse the microscope in its slide, the microscope being held in contact with the micrometer by a spring 84 secured at one end to the microscope and at the other end to a portion 85 of the base casting 4, the spring being arranged to pass through a suitable opening in the latter. A suitable pin 86 on the microscope carriage is arranged to bear against the micrometer.

The method of procedure is as follows. Before the load is applied to the specimen the micrometer is used to slide the microscope till it is observed that the curved point of the needle, Figure 4, coincides with the cross wire. A small load is then applied and again the micrometer is used to move the microscope, each time the reading of the micrometer is noted and recorded. If the micrometer head has not specially been graduated in tons per square inch, then a table of equivalents must be used to interpret the micrometer readings into tons per square inch.

It will be observed that while the specimen is stretching elastically, the deflections of the beam for each turn of the handle 12 are uniform, but when the material begins to yield the deflection for each turn of the handle increases. This effect will be still more apparent if a graph be prepared, showing turns of handle compared with the stress in tons per square inch.

The figures at which the yield point, maximum stress and fracture occur are noted. The elongation and reduction in area percentage are obtained in the customary manner by measuring the specimen before and after fracture.

The handle 35, shown in Figure 2 enables the screw 13 to be rapidly reversed for the next test.

In Figures 1 and 2 is shown, by way of example, how part of the instrument is adapted for measuring the Brinell hardness. A hard steel ball 61 is let into a raised portion on the back of the disc 6, and the raised portion has a slit or saw cut 62 across it to enable the ball when defective to be dislodged and replaced by a fresh ball.

The specimen to be tested is held up to the ball by means of the large screw 63 carried in the main casting. The lock screw 64 is then tightened which presses a piece of soft copper 65 on to the thread of screw 63; then the screw 66 is rotated till its point drives forward the rod 67 so as to press the specimen against the steel ball and cause the disc 6 to deflect the spring 1 until the needle 73 is seen to reach a predetermined mark on the graduated scale in the eye-piece of the microscope. The rod 67 is prevented from rotation by a pin or key 68 operating between the rod and the containing screw 63.

After a few seconds the specimen is removed, the diameter of the ball impression or dent in the specimen is measured and the hardess figure then obtained from prepared tables.

The instrument shown in the drawings may be used for measuring bending and compression stress by the use of suitable attachments adapted to be mounted on the spherical heads 14 and 29 and so arranged as to apply the load to a suitably shaped test specimen in such a way as to tend to bend or compress the latter as the case may be.

I claim:—

1. In a testing instrument for measuring physical properties of specimens of steel and other materials under load, the combination of a base, means carried by the base for applying a tensile load to one end of a specimen under test, supports fixed to the base, a stiff plate-spring anchored at its ends to said supports, means for coupling the other end of the specimen to the central portion of the spring to cause the spring to be deflected in proportion to the load applied to the specimen, an indicator carried by the spring on the central portion thereof, a trackway formed on said base adjacent to the spring and extending at right angles thereto, a bracket slidably mounted on the trackway, a microscope carried directly by the bracket for magnifying the deflection of the indicator to enable a comparatively small deflection of the latter to be accurately determined, a scale for determining the load corresponding to the deflection of the virtual image of the indicator observed in the microscope, and means whereby the effective length of said plate-spring may be varied in order that the scale markings may indicate directly the load per unit area on the specimen.

2. In a testing instrument for measuring physical properties of specimens of steel and other materials under load, the combination of a base, a chuck movably carried on the base for gripping one end of a specimen under test, means carried by the base for applying a tensile load to said chuck, supports fixed to the base, a stiff plate-spring anchored at its end to said supports, a chuck for gripping the other end of the specimen, means coupling said last-mentioned chuck to the central portion of the spring to cause the spring to be deflected in proportion to the load applied to the specimen, an indicator carried by the spring on the central portion thereof, a trackway formed on said base adjacent to the spring and extending at right angles thereto, a bracket slidably mounted on the trackway, a microscope carried directly by the bracket for magnifying the deflection of the indicator to enable a comparatively small deflection of the latter to be accurately determined, a scale for determining the load corresponding to the deflection of the virtual image of the indicator observed in the microscope, and means whereby the effective length of said plate-spring may be varied in order that the scale markings may indicate directly the load per unit area on the specimen.

3. In a testing instrument for measuring physical properties of steel and other materials under load, the combination of a base, means carried by the base for applying a tensile load to one end of a specimen under test, supports fixed to the base, a stiff plate-spring anchored at its ends to said supports, means for coupling the other end of the specimen to the central portion of the spring to cause the spring to be deflected in proportion to the load applied to the specimen, packing pieces of rubber or similar shock-absorbing material situated at the ends of said spring and between the spring and the said supports and arranged to absorb the blow due to recoil of the spring when the specimen breaks, an indicator carried by the spring on the central portion thereof, a trackway formed on said base adjacent to the spring and extending at right angles thereto, a bracket slidably mounted on the trackway, a microscope carried directly by the bracket for magnifying the deflection of the indicator to enable a comparatively small deflection of the latter to be accurately determined, a scale for determining the load corresponding to the deflection of the virtual image of the indicator observed in the microscope, and means whereby the effective length of said plate-spring may be varied in order that the scale markings may indicate directly the load per unit area on the specimen.

4. In a testing instrument for measuring physical properties of specimens of steel and other materials under load, the combination of a base, means carried by the base for applying a tensile load to one end of a specimen under test, supports fixed to the base, a stiff plate-spring anchored at its ends to said supports, means for coupling the other end of the specimen to the central portion of the spring to cause the spring to be deflected in proportion to the load applied to the specimen, a spring clip mounted on the central portion of the spring, an indicator-needle carried by the spring clip, a trackway formed on said base adjacent to the spring and extending at right angles thereto, a bracket slidably mounted on the trackway, a microscope carried directly by the bracket for observing the point of the indicator-needle and magnifying the deflection of the indicator-needle to enable a comparatively small deflection of the latter to be accurately determined, a scale for determining the load corresponding to the deflection of the virtual image of the point of the indicator-needle observed in the microscope, and means whereby the effective length of said plate-spring may be varied in order that the scale markings may indicate directly the load per unit area on the specimen.

5. In a testing instrument for measuring physical properties of specimens of steel and other materials under load, the combination of a base, means carried by the base for applying a tensile load to one end of a specimen under test, supports fixed to the base, a stiff plate-spring anchored at its ends to said supports, means for coupling the other end of the specimen to the central portion of the spring to cause the spring to be deflected in proportion to the load applied to the specimen, an indicator carried by the spring on the central portion thereof, an upstanding V-shaped ridge formed on said base adjacent to the spring and extending at right angles thereto, a bracket slidably mounted on the base and formed in its under-face with a V-shaped groove engaging the V-shaped ridge on the base, a microscope carried directly by the bracket for magnifying the deflection of the indicator to enable a comparatively small deflection of the latter to be accurately determined, a scale for determining the load corresponding to the deflection of the virtual image of the indicator observed in the microscope, and means whereby the effective length of said plate-spring may be varied in order that the scale markings may indicate directly the load per unit area on the specimen.

6. In a testing instrument for measuring physical properties of specimens of steel and other materials under load, the combination of a base, means carried by the base for applying a tensile load to one end of a specimen under test, supports fixed to the base, a stiff plate-spring anchored at its ends to said supports, means for coupling the other end of the specimen to the central portion of the spring to cause the spring to be deflected in proportion to the load applied to the specimen, an indicator carried by the spring on the central portion thereof, a trackway formed on said base adjacent to the spring and extending at right angles thereto, a bracket slidably mounted on the trackway, a microscope carried directly by the bracket for magnifying the deflection of the indicator, a scale in the eye-piece of the microscope for measuring the deflection of the virtual image of the indicator observed in the microscope, and means whereby the effective length of said plate-spring may be varied in order that the scale markings may indicate directly the load per unit area on the specimen.

7. In a testing instrument for measuring physical properties of steel and other material under load, the combination of a base, means carried by the base for applying a tensile load to one end of a specimen under test, supports fixed to the base, a stiff plate-spring anchored at its ends to said supports, means for coupling the other end of the specimen to the central portion of the spring to cause the spring to be deflected in proportion to the load applied to the specimen, an indicator carried centrally by the spring, a trackway formed on the base adjacent to the spring and at right angles thereto, a bracket slidably mounted on the trackway, a microscope carried directly by the bracket for observing the indicator, a cross-wire in said microscope, micrometer adjusting means for adjusting the said bracket along the trackway to enable the cross-wire to be aligned with the virtual image of the indicator, a scale associated with the micrometer adjusting means for measuring movements of the bracket along the trackway, and means whereby the effective length of said plate-spring may be varied in order that the scale markings may indicate directly the load per unit area on the specimen.

8. In a testing instrument for measuring physical properties of steel and other materials under load, the combination of a base, means carried by the base for applying a tensile load to one end of a specimen under test, supports fixed to the base, a stiff plate-spring anchored at its ends to said supports, means for coupling the other end of the specimen to the central portion of the spring to cause the spring to be deflected in proportion to the load applied to the specimen, a spring clip mounted centrally on the spring, an indicator-needle carried by the spring clip, a trackway formed on the base adjacent to the spring and at right angles thereto, a bracket slidably mounted on the trackway, a microscope carried directly by the bracket for observing the point of the indicator-needle, a cross-wire in said microscope, micrometer adjusting means for adjusting the said bracket along the trackway to enable the cross-wire to be aligned with the virtual image of the point of the indicator-needle, a coil-spring for holding said bracket in engagement with the micrometer adjusting means, a scale associated with the micrometer adjusting means for measuring movements of the bracket along the trackway, and means whereby the effective length of said plate-spring may be varied in order that the scale markings may indicate directly the load per unit area on the specimen.

9. In a testing instrument for measuring physical properties of steel and other materials under load, the combination of a base, means carried by the base for applying a tensile load to one end of a specimen under test, supports fixed to the base, a stiff plate-spring anchored at its ends to said supports, packing pieces of shock-absorbing material interposed between the spring and the supports, means for coupling the other end of the specimen to the center of the spring to deflect the latter in proportion to the load applied to the specimen, a spring clip mounted centrally on the spring, an indicator-needle carried by the spring clip, an upstanding V-shaped ridge formed on the base adjacent to the spring and at right angles thereto, a bracket slidably mounted on the base and formed with a V-shaped groove engaging the said V-shaped ridge, a microscope carried directly by the bracket for observing the point of the indicator-needle, a cross-wire in said microscope, micrometer adjusting means for adjusting the said bracket along the V-shaped ridge on the base to enable the cross-wire to be aligned with the virtual image of the point of the indicator-needle, a coil-spring for holding said bracket in engagement with the micrometer adjusting means, a scale associated with the micrometer adjusting means for measuring movements of the bracket along the base, and means whereby the effective length of said plate-spring may be varied in order that the scale markings may indicate directly the load per unit area on the specimen.

LESLIE HAYWOOD HOUNSFIELD.